United States Patent [19] [11] 4,247,502
Loechell [45] Jan. 27, 1981

[54] CUTTING OF HIGH SURFACE-TACK HOT MELT ADHESIVES

[75] Inventor: Carl C. Loechell, Glen Ellyn, Ill.

[73] Assignee: Unitech Chemical Inc., Chicago, Ill.

[21] Appl. No.: 54,660

[22] Filed: Jul. 3, 1979

[51] Int. Cl.[3] .................... B29C 25/00
[52] U.S. Cl. .................... 264/130; 264/143
[58] Field of Search .................... 264/130, 143

[56] References Cited

U.S. PATENT DOCUMENTS

| | | | |
|---|---|---|---|
| 2,021,961 | 11/1935 | McFarlane | 264/130 |
| 3,519,706 | 7/1970 | Pantsios | 264/143 |
| 3,840,632 | 10/1974 | Maxion | 264/130 |
| 4,088,727 | 5/1978 | Elliott | 264/130 |

*Primary Examiner*—Thomas P. Pavelko
*Attorney, Agent, or Firm*—Jay C. Langston; W. C. Davis

[57] ABSTRACT

High surface-tack hot melt adhesives, when coated with certain powders, can be cut into small pieces with little difficulty after extrusion onto a cooling belt.

5 Claims, No Drawings

CUTTING OF HIGH SURFACE-TACK HOT MELT ADHESIVES

This invention relates to a method of cutting tacky, polymeric materials which are sticky at room temperature. More specifically, this invention concerns a method for cutting hot melt adhesives which have been extruded onto a cooling belt.

Hot melt adhesives are usually thermoplastic materials useful in bonding a large variety of substrates. These adhesives are used to bond metal to metal, paper to paper, flexible package films to themselves and to paper, aluminum to Styrofoam, polyethylene to glass, etc. It is advantageous to use hot melts because they increase the speed of production, i.e., the speed with which they produce a bond. They are generally economical to use because they are 100% solids. In addition, they do not contain or produce volatile materials such as flammable organic solvents or toxic substances. Hot melt adhesives are usually indifferent to extreme hot or cold and hence, no storage precautions are needed to insure safe stocking and storage of these products.

It is difficult to provide suitable containers for packaging tacky, polymeric substances because of the tendency to block. Hot melts have been placed in metal and other containers without a great deal of success. In one method a hot melt is extruded into a shirred regenerated cellulose container. After the casing is filled, it is removed from the extrusion horn and the open end of the casing is securely fastened. After the packaged hot melt adhesive is cooled, it can be rolled into a coil or cut to various lengths by means of an axe. See U.S. Pat. No. 3,314,536. However, smaller pieces are much more desirable and the regenerated cellulose must be removed by soaking in water followed by peeling away the cellulose from the adhesive.

The present state of the art is to place the tacky hot melt adhesive in releasable cartons without cutting them. That is, after a tacky, blocking, hot melt adhesive is formulated, it is usually poured into a release carton or a series of release cups or trays. These plastic release cups and trays are relatively expensive to produce and take up space in the shipping containers. In addition, solidified hot melts in plastic trays are still relatively large pieces and it is desirable to have hot melt adhesives subdivided into smaller pieces. However, very serious difficulties have been encountered in devising suitable means for subdividing the hot melts. If they are extruded onto a cooling belt, they are impossible to cut with any uniformity as they tend to wind around the knife or cutter.

It is known in the prior art that various dusting materials have been used to prevent blocking (the property of sticking to itself). In addition, various releasing agents have been coated on hot melt to aid in separating the adhesive from its container. However, dusting materials and releasing agents sometimes detract from the adhesive properties of the hot melts.

It is therefore an object of this invention to provide agents which enable one to cut hot melt adhesives with a minimum of problems.

It is also an object of this invention to provide cutting agents that do not impair the performance and adhesive properties of the hot melt.

It is a further object of the invention to provide a method of cutting hot melt adhesives which will not affect the color of the adhesive material.

It is a still further object of this invention to provide a system wherein tacky, blocking hot melts may be extruded and subdivided into relatively small particles.

In general, this invention relates to a method of cutting thermoplastic materials. The thermoplastic material is extruded onto a cooling belt and coated with a powder hereinafter defined before cutting.

Hot melt adhesives intended to be cut in accordance with the instant invention are thermoplastic polymers which are liquid at some elevated temperature yet set to a strong bond when cooled. They are bonding agents which achieve a solid state and resultant strength by cooling, as contrasted with other adhesives which achieve the solid state through evaporation or removal of solvents.

There is a wide variety of ingredients that go into making a hot melt. The formulator has a wide selection of usually low-molecular weight, natural and synthetic waxes, resins and polymers to choose from. These include rosins and its derivatives, terpene resins, vegetable and petroleum waxes, phenol-formaldehyde resins, saturated and unsaturated hydrocarbon resins, etc.

These ingredients usually melt easily to low viscosity fluids. In order to be converted to more useful adhesives, higher molecular weight polymers are blended therewith. Higher molecular weight polymers, which are typically blended with the natural and synthetic waxes and resins to toughen or reinforce the same, include polyamides, copolymers of ethylene and vinyl acetate, polyester block polymers (styrene-butadiene-styrene or styrene-isoprene-styrene or styrene-polyolefin-styrene) atatic amorphous polypropylene ethyl cellulose, acrylates and methacrylates, polyethylene and polystyrene, etc. While hot-melts are usually a blended mixture of various polymers, it should be understood that any one of the above-mentioned ingredients may be used singly or in combination depending upon the properties desired. In addition, the hot melts may contain pigments, fillers and antioxidants.

In accordance with the present invention, the molten hot melt adhesives are formulated at temperatures between about 225° F. and 600° F. and are then permitted to flow or extrude onto a cooling belt to be subdivided. The hot melt may be extruded as one strip or a plurality of strips. Systems wherein the hot melt has been extruded as 48 strips has worked very satisfactorily. The powder is applied on the top or bottom of the extruded strips on the end of the belt or at the beginning of the table before the cutter.

Generally speaking, about 0.5 to about 8.0 pounds of powder per 4,000 pounds of hot melt is used. It is preferred, however, to use about 1 to 1.5 pounds of powder per 4,000 pounds of hot melt. The powder is applied onto the extruded strips with the help of either a fluidized bed, vibrating screen or rotating brush.

It is important that the hot melt be cut when it has a temperature of about 85° to about 115° F., preferably 90° F. to 110° F. If the extruded strips are too cold, they will be brittle and shatter. On the other hand, if the hot melt is too hot it will stick to the knife and not release from the belt.

In this regard, the physical dimensions of the extruded strips are important. The strips are usually about one inch wide and less than one-half inch in thickness. It is preferred to have the thickness of the strips less than about $\frac{3}{8}$" and more preferable about $\frac{1}{8}$ to $\frac{1}{4}$" in thickness. If the extruded strips are too thick, the skin or surface of the strip will be cool, but the internal portion will be hot. Such strips do not cut satisfactorily.

The powders used in carrying out the process of this invention must be capable of adhering to the surface of the high tack hot melt adhesives so as to just form a monomolecular coating so that the performance of the adhesive properties of the hot melt are not impaired. The preferred powder should be either part of the formula or be compatible with the formula. An example of this would be an anti-oxidant.

Useful powders are the metal salts of di-n-alkyldithiocarbamate and N,N'-dialkyl ethylenediamines. The alkyl portion of the thiocarbamates usually contains one to 8 carbons while the alkyl portion on the ethylene diamines contains about 10 to 20 carbons. Two powders that have shown outstanding performance with the ability to permit cutting of the tacky/hot melts without affecting the color, performance or adhesive properties are:

zinc di-n-butyldithiocarbamate and N,N'-distearyl ethylenediamine.

Suitable powders which may become part of the formula include the antioxidants such as Ethyl 702 which is 4,4' methylene bis(2,6-di tertbutyl phenol) and Naugard 445 which is Benzenamine, 4-(1-methyl-1-phenylethyl)-N-[4-(1-methyl-(-1-phenyl ethyl)phenyl] having a formula of $C_{30}H_{31}N$. Another class of suitable coating powders may be the powdered high melting low molecular weight homopolymers of ethylene. These materials usually have molecular weights of up to about 2,000.

The following examples are presented to illustrate the invention. It will be understood that the examples are illustrative and should not be taken in any manner as limiting the invention as defined in the appended claims.

EXAMPLE I

A hot melt adhesive comprising 41 parts of a copolymer of ethylene-vinyl acetate (28% acetate), 47 parts of a tackifier consisting of a pentaerythritol ester of rosin and 12 parts of a wax was heated and extruded from a plurality of nozzles onto a moving cooled belt. The strips of hot melt were dusted with N,N'distearyl ethylenediamine in an amount of about one pound of powder per 4,000 pounds of adhesive. The strips were about $\frac{1}{4}$ inch in thickness and when the dusted hot melt reached a temperature of about 100° F. it was cut into pieces of approximately one to two inches in length. The chips of hot melt were collected and placed into containers without blocking.

EXAMPLE II

A hot melt adhesive comprising approximately 66% of a copolymer of ethylene vinyl acetate and 34% of a terpene resin was heated and extruded onto a cooled belt wherein the strips were about one inch wide and about $\frac{3}{8}$ inch in thickness. The strips were dusted with zinc di-n-butyldithiocarbamate in an amount of about 8 pounds of powder per 4,000 pounds of hot melt. The hot melt strips were cut into one inch pieces when the strips were at a temperature of about 90° F. The one inch pieces were placed into containers without blocking.

EXAMPLE III

A hot melt adhesive consisting of approximately 75 parts of copolymer of ethylene vinyl acetate and 25 parts of a glycerol ester of hydrogenated wood rosin was extruded in a series of strips on a cooling belt and dusted with 4,4' methylene bis(2,6-di tertbutyl phenol) in an amount of about 2 pounds of powder per 4,000 pounds of hot melt. The strips were about $\frac{1}{4}$ inch in thickness and were cut into chips of about $1\frac{1}{2}$ inches in length when the temperature of the strips was cooled to about 110° F. The chips did not block.

EXAMPLE IV

A hot melt adhesive comprising 11% copolymer of ethylene-vinyl acetate, 25% low density polyethylene and 36% tackifier which was glycerol ester of hydrogenated wood rosin was extruded into a cooling belt in strips of about one inch wide and $\frac{1}{4}$ inch in thickness. The strips were dusted with Naugard 445 in an amount of about one pound of powder per 4,000 pounds of hot melt. The strips were cut at a temperature of 95° F. into short lengths and were collected and stored without blocking.

EXAMPLE V

A hot melt adhesive of about 40 parts of a copolymer of vinyl acetate, 48 parts of a tackifier (blend of glycerol ester of hydrogenated wood rosin and pentaerythritol ester of rosin) and 12 parts of wax was extruded onto a cooling belt in narrow strips of about $\frac{1}{4}$ inch in thickness. The strips were dusted with N,N' distearyl ethylene diamine in an amount of about 0.5 pounds per 4,000 pounds of hot melt. The strips were cut at a temperature of about 95° F. into lengths of about $1\frac{1}{2}$ inches and were collected and stored without blocking.

EXAMPLE VI

A hot melt adhesive comprising about 36 parts of a copolymer of ethylene vinyl acetate, 44 parts of a glycerol ester of hydrogenated rosin and 10 parts of a wax was heated and extruded into strips about one inch wide and $\frac{1}{2}$ inch thick. The strips were dusted with zinc di-n-butyldithiocarbamate in an amount of 6 pounds per 4,000 pounds of hot melt. When the strips reached a temperature of about 90° F. they were cut into chips having a length of about $1\frac{1}{2}$ inches. The chips were packaged and did not block.

It is apparent that many modifications and variations of the invention as hereinbefore set forth may be made without departing from the spirit and scope thereof. Specific embodiments described in the examples and specification are given by way of illustration only, as it is obvious to the hot melt formulator that all types of raw materials, whether natural products or synthetic materials, may be treated in accordance with the teaching of the instant invention. It is also obvious to the adhesive technologist that one may modify the now existing materials by blending them to suit particular requirements.

I claim:

1. A method of cutting high surface-tack hot melt adhesives which comprises heating the hot melt adhesive to a temperature of between about 225° F. and about 600° F., extruding the adhesive in the form of narrow strips of about one inch wide and less than about $\frac{1}{2}$ inch in thickness onto a cooling belt, dusting the adhesive with a compatible powder in an amount to form a monomolecular coating thereon so that the subsequent performance of the adhesive properties is not impaired, and subdividing the dusted adhesive strips when they obtain a temperature of about 85° F. to about 115° F.

2. The method of claim 1 wherein the adhesive strips are dusted with about 0.5 to about 8 pounds of powder per 4,000 pounds of adhesive.

3. The method of claim 1 wherein the strips are dusted with a member selected from the group consisting of antioxidants, metal salts of di-n-alkyl dithiocarbamates and N,N'-dialkyl ethylenediamines.

4. The method of claim 1 wherein the dusting powder is zinc di-n-butylidithiocarbamate.

5. The method of claim 1 wherein the dusting powder is N,N' distearyl ethylenediamine.

* * * * *